July 14, 1970   R. J. ETTER ET AL   3,520,543
SEAL FOR SUCTION TYPE ANCHORS
Filed Sept. 19, 1967

INVENTORS
ROBERT J. ETTER
JOHN O. SCHERER, JR.

BY *Robillard & Byrne*

ATTORNEYS

United States Patent Office 3,520,543
Patented July 14, 1970

3,520,543
SEAL FOR SUCTION TYPE ANCHORS
Robert J. Etter, Silver Spring, and John O. Scherer, Jr., Laurel, Md., assignors to Hydronautics, Inc., Howard County, Laurel, Md., a corporation of Maryland
Filed Sept. 19, 1967, Ser. No. 668,965
Int. Cl. F16j 15/02
U.S. Cl. 277—205   5 Claims

ABSTRACT OF THE DISCLOSURE

A sealing means including a torus seal having a rigid pressure plate forming the upper portion of the torus from which there is subtended a U-shaped yieldable but substantially non-stretchable member of elastomer defining the side walls and bottom of the torus. The U-shaped member having an inner chamber confining a non-compressible liquid, and rigid means extending exterior of the torus from the pressure plate and upwardly therefrom to attach the torus to the anchor and provide a barrier therebetween.

---

The invention herein is a sealing means for suction type anchors such as that shown in the copending application of Johnson et al., Ser. No. 528,635 filed on Feb. 18, 1966, now Pat. No. 3,348,517, or in the patent to Lente No. 2,347,491.

The primary object of the invention is a seal which, for a predetermined design load, is operable at the designed load over depths from a few hundred feet to several thousand feet and at depths less than a few hundred feet is operable for lesser loads.

It has long been recognized that performance of a suction anchor depends upon its adhesion to the surface of the submerged object, and the adhesion upon the ability of the seal to comply with the surface of the object to prevent leakage and establish sufficient friction to prevent slippage. So far as applicants are aware, the art has turned to mechanical devices, and electromagnets for use at deep submergence, because known highly yieldable seals collapse, or otherwise deform under the pressures generated at great depths.

Summarizing, the torus seal described herein is yieldable to comply with the surface of the submerged object to prevent leakage and to maintain sufficient surface-to-surface contact to prevent slippage through frictional resistance, the seal being substantially non-compressible whereby collapse is prevented, and including rigid means exterior of the torus for attaching same to the anchor and providing a barrier therebetween.

The foregoing and other objects and advantages of the invention will become apparent from the description thereof when read in light of the accompanying drawings, wherein.

Figure 1:
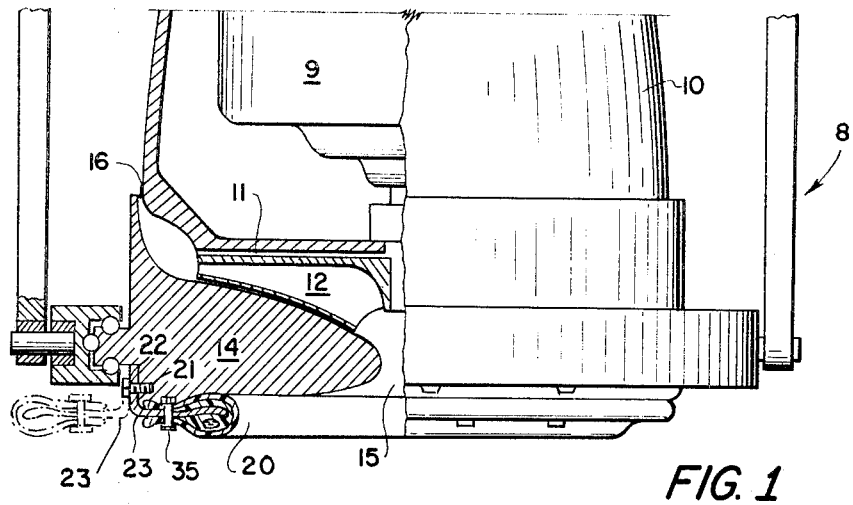
FIG. 1 shows the sealing means attached to an anchor of the type disclosed in the above-described application, only so much of the anchor being shown as is necessary for an understanding of the invention herein.

Referring to the drawings wherein similar parts are given the same number, the anchor 8 shown in FIG. 1 includes a casing 10, in which there is mounted a motor 9 for driving the impeller 12 positioned in the casing chamber 11 immediately above the base 14. The base 14 has a central inlet 15 with the wall curving upwardly and inwardly toward the eye of the impeller, and upon operation of the latter, water will be drawn into the impeller chamber and discharged through the casing outlets 16.

Positioned peripherally of the anchor base 14 is the sealing means 20 embodying the invention herein, which, when seated on the surface of a submerged object must effectively define with the surface of the object, and bottom of the anchor a closed chamber, from which the impeller 12 evacuates the water whereby a differential in pressure is established for retaining the anchor in position.

More specifically the sealing means includes a vertically arranged circumferential rim 22 which surrounds the exterior of the anchor base 14, and is secured thereto, by studs 21 which extend through openings in the rim and are screw threaded into aligned openings in the anchor base. Extending radially inward or outward as indicated in FIG. 1, from the rim is a neck portion 23 (see FIG. 2) supporting a co-extensive pressure plate 24 below and substantially parallel to the anchor base. The pressure plate 24 constitutes the upper portion of the torus seal. The rim, neck and pressure plate are rigid, preferably integral and made of an anti-corrosive material such as stainless steel. The rim 22 and neck 23 not only provide the means supporting and connecting the torus seal to the anchor but constitute a barrier to prevent ingress of water over the seal when the latter is seated.

Subtended from the pressure plate 24 is a U-shaped yieldable compact body member 26 in which there is a chamber 28 confining a non-compressible liquid 30. The member 26 is an elastomer which will permit yielding of the member without any appreciable stretch; herein being shown as a rubber having a Shore Durometer reading of 35. For convenience in manufacture, the member 26 is molded onto the pressure plate, and to assure a sufficient bond the rubber is carried around the free edge end of the pressure plate and across the upper surface thereof. Except for providing the increased bond this construction does not contribute to or detract from the functioning of the seal despite the slight distortion at the edge of the plate. The liquid chamber 28 is also formed within the member 26, but to assure that the liquid will not disperse into the rubber under extreme pressure, an inner tube (not shown) may also be included.

Figure 2:
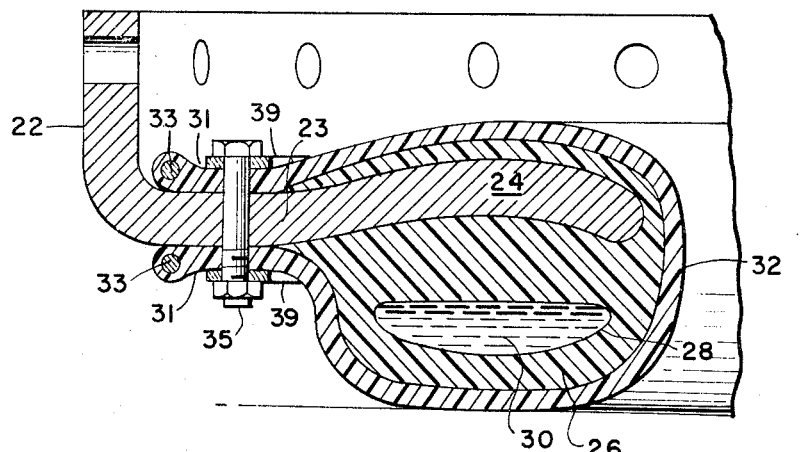
FIG. 2 is an enlarged partial view of the preferred sealing means shown in FIG. 1.

Seals of this type are subjected to considerable abuse, and for this reason, the preferred embodiment of FIGS. 1 and 2 include a second U-shaped casing member 32 which is also yieldable but not stretchable. The U member 32 is a split casing of reinforced rubber which completely encompasses the U member 26, including the overlie above the pressure plate. The casing has opposed collar portions 31 which terminate in reinforced edge members 33. The casing is secured in position by bolts 35 which pass through aligned openings in clamping bands 39 which overlie the casing collar portions 31 and openings in the neck 23.

From the foregoing it can be seen that when the bottom of the subtended U member of the seal seats on the surface of the submerged object (FIG. 2) the force exerted by the pressure plate 24 is transmitted through the non-compressible liquid and will cause a reshaping of the yieldable members to comply with the surface upon which it rests. As the full pressure at the submerged depth is being utilized, the bottom of the U tends to flatten on the surface of the submerged object and the yielding of the U member will be an almost symmetrical bulging of the sides thereof.

As an example, an anchor of the type shown having a 16 inch diameter base and a weight of 90 lbs. will, when equipped with this type of seal, hold relatively fixed a cable transmitting a load of 2300 lbs. in both a vertical and horizontal direction at depths from approximately 250 ft. to 8000 ft., the ambient pressure at 8000 feet being 3550 p.s.i. At lesser depths, the load must be reduced. A surface contact of the torus of about 2.25 inches width with the submerged object will provide a 0.2 coefficient of friction, which is sufficient to prevent slippage. The friction may be increased by embedding suitable abrasives in the bottom surface of the U-shaped member. The cross sectional area of the torus as seen in FIG. 2 is approximately 12 square inches. The anchor defined has a relatively small diameter and on a submerged object such as a submarine having a hull section with a twenty foot radius, the torus seal can be inward or outward, at great depths; outward being preferred as the external pressure is directly on the pressure plate. For anchors of larger diameter, the outward seal is also preferred, and in such instances a double seal may be used to reduce the size of the chamber which must be evacuated. The pressure on the water trapped between the seals will cause some to be forced to the low pressure side until stabilized.

Figure 3:
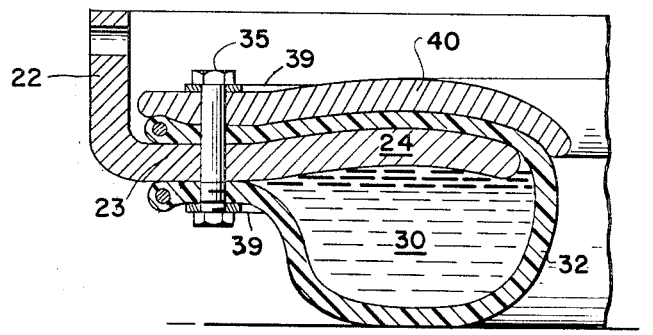
FIG. 3 is a view similar to FIG. 2 of another embodiment of the sealing means.

Referring now to the embodiment shown in FIG. 3 it utilizes only the U-shaped member 32, the interior thereof being the chamber confining the non-compressible liquid 30. However, there must be provided a restraining plate 40 overlying the pressure plate 24 to clamp the casing overlie tight against the upper surface of the pressure plate and thus prevent the confined liquid from being forced therebetween and cause a roll over of the U member. The restraining member 40 is of sufficient width to also overlie the neck portion 23 and has openings therethrough to receive the bolts 35 for securing it in position. The functioning of this embodiment is the same as that of the preferred embodiment.

It is apparent that many changes may be made. For example, the pressure plate attaching means could be integral with the bottom of the anchor, but removability is preferred as rapid replacement may be desirable. It should also be recognized that numerous elastomers are available and the determination of the type to be used is well within the skill of the art, the requirement being that the U member 26 of the first embodiment must be substantially free of voids to prevent collapse and the U member 32 obviously of sufficient strength to remain liquid tight.

The invention having been described the patentable subject matter is defined in the following claims.

We claim:
1. A sealing means for use with a suction type anchor comprising a yieldable substantially non-compressible torus seal defined by an upper rigid pressure plate, a U-shaped member of yieldable material subtended from the pressure plate and completing the torus, the U-shaped member having a chamber therein confining a non-compressible liquid, rigid supporting means for the torus coextensive with and extending from the pressure plate exterior of torus, and said rigid supporting means having an upwardly extending portion for securing it to the anchor and providing a barrier between an anchor and the torus.

2. The device defined in claim 1 wherein the subtended U-shaped member is a compact body supported by the pressure plate and having a chamber therein.

3. The device defined in claim 2 including a second U-shaped split casing member of yieldable material encompassing the first U-shaped member and pressure plate and means securing it to the torus supporting means.

4. The device defined in claim 1 wherein the U-shaped member is a split casing subtended from the pressure plate and having a portion extending over the upper surface of the pressure plate and including a rigid restraining member overlying and clamping the casing portion extending over the pressure plate.

5. The device as defined in claim 1 including a second pressure plate and subtending a like U-shaped member, said second pressure plate extending from said supporting means opposite to the first pressure plate.

References Cited

UNITED STATES PATENTS

| | | | |
|---|---|---|---|
| 2,190,476 | 2/1940 | Haupt et al. | 277—226 X |
| 2,347,491 | 4/1944 | Lente | 114—51 |
| 2,688,436 | 9/1954 | Melaven | 277—34 X |
| 2,700,196 | 1/1955 | Panhard | 277—226 X |
| 3,051,117 | 8/1962 | Hunter | 114—206 |
| 3,348,517 | 10/1967 | Johnson et al. | 114—206 |

LAVERNE D. GEIGER, Primary Examiner

J. S. MEDNICK, Assistant Examiner

U.S. Cl. X.R.

114—51, 206; 277—178, 226, 235